C. O. MAPHIS.
HEADLIGHT.
APPLICATION FILED AUG. 16, 1913.
1,087,028.
Patented Feb. 10, 1914.
2 SHEETS—SHEET 1.
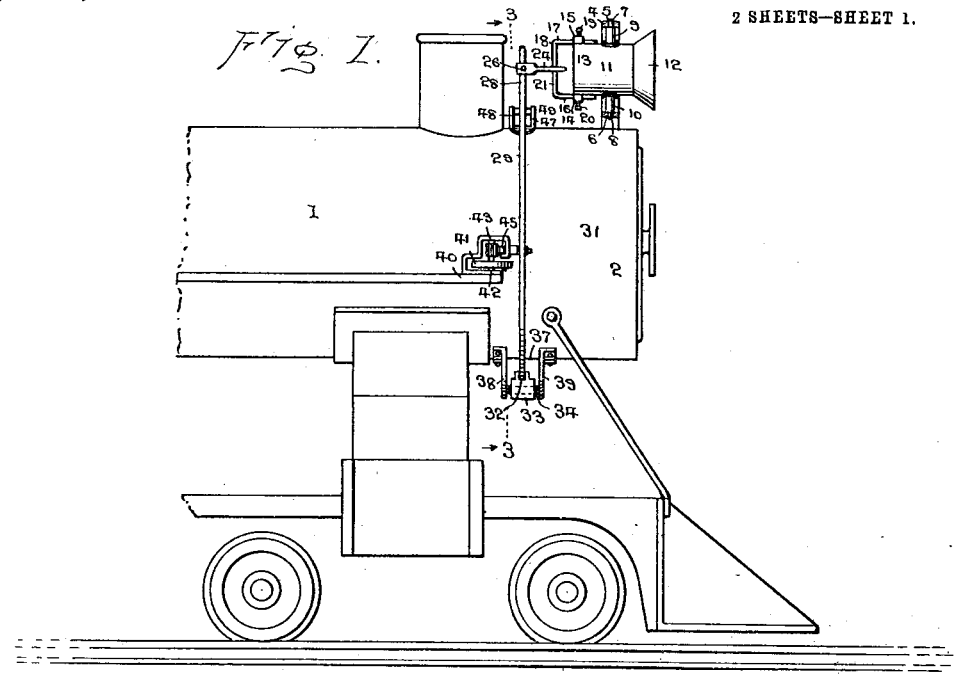
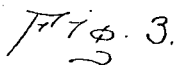
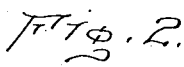
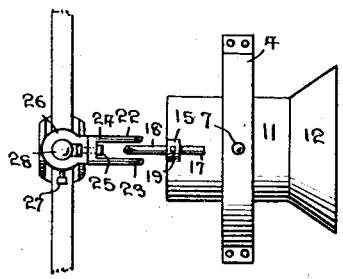
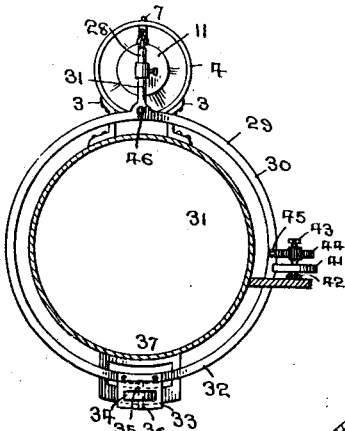
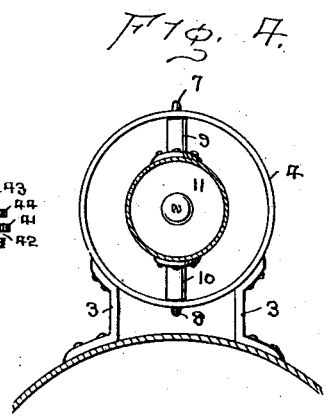
Witnesses
Thos. W. Riley
W. H. Singleton
Inventor
Charles Owen Maphis
By J. L. Atkins.
Attorney

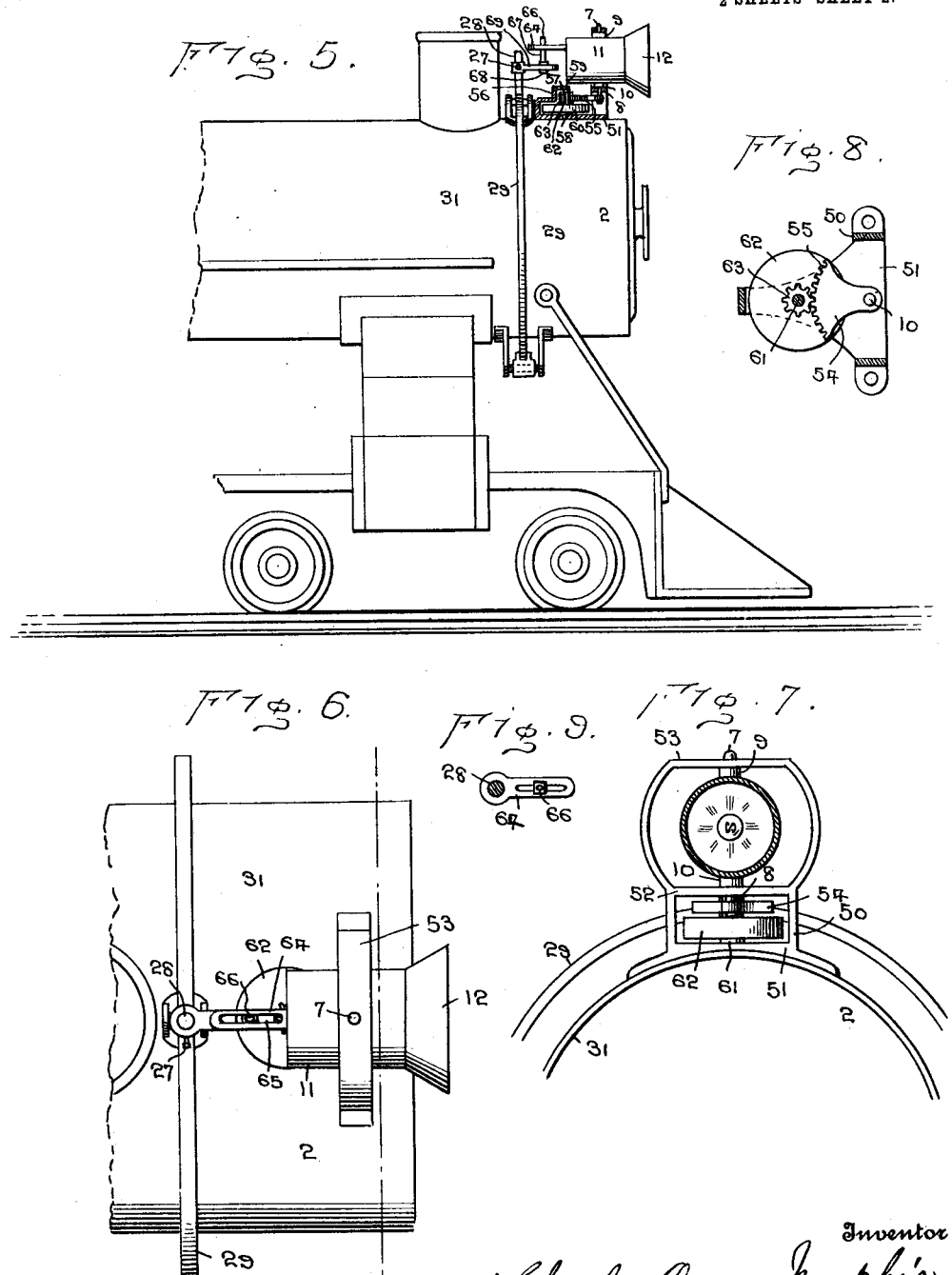

UNITED STATES PATENT OFFICE.

CHARLES OWEN MAPHIS, OF LINVILLE, VIRGINIA, ASSIGNOR OF ONE-HALF TO WILLIAM PAXTON, OF WOODSTOCK, VIRGINIA.

HEADLIGHT.

1,087,028.  Specification of Letters Patent.  Patented Feb. 10, 1914.

Application filed August 16, 1913. Serial No. 785,029.

*To all whom it may concern:*

Be it known that I, CHARLES OWEN MAPHIS, a citizen of the United States, residing at Linville, in the county of Rockingham and State of Virginia, have invented certain new and useful Improvements in Headlights, of which the following is a specification.

This invention relates to a new and useful improvement in devices for automatically keeping the headlights of locomotives in line with the track, whatever may be the variation of the curves of the road.

It relates more particularly to a device for steadying the movement of a swinging headlight, and also for adjustment of the same, so that it may be adapted to different rates of speed.

To this end the invention consists primarily in adapting to such a device a balance wheel and also an adjusting mechanism.

In the annexed drawings: Figure 1 represents the side view of the front end of a locomotive provided with one form of the device. Fig. 2 represents a top view looking down on the headlight and adjusting mechanism. Fig. 3 represents a view taken on line 3—3, Fig. 1, looking in the direction of the arrows. Fig. 4 represents a partial enlarged end view, partly in section, of Fig. 1, looking from the front. Fig. 5 represents a view similar to Fig. 1, showing another form of the device. Fig. 6 represents a top or plan view looking down upon the mechanism shown in Fig. 5. Fig. 7 represents an enlarged partial end view, partly in section, of Fig. 1, looking forward from the front. Fig. 8 is a plan view of the balancing mechanism shown in Fig. 5. Fig. 9 is a detailed drawing of part of the adjusting mechanism.

In these drawings: the numeral 1, Sheet 1, represents the forward end of a locomotive to which the mechanism is attached. Rising from the top of the locomotive, 1, at its front end, 2, are two supports, 3—3, carrying a ring, 4. This ring, 4, has at the top and bottom of its vertical diameter, holes, 5 and 6. In these holes, 5 and 6, loosely bear pintles, 7 and 8, of vertical rods, 9 and 10, which carry the usual headlight, 11, having the flaring open end, 12. At its rear end, 13, this headlight, 11, has supports, 14 and 15, in which are adjustably held the inturned ends, 16 and 17, of a yoke, 18, by set screws, 19 and 20. The vertical bar, 21, of the yoke, 18, is loosely held between the prongs, 22 and 23, of a fork, 24. This fork, 24, is held by a swivel, 25, to a head, 26. This head, 26, is adjustably held by a set screw, 27, upon the upper end, 28, of an oscillator, 29. This oscillator, 29, consists of a ring, 30, and the vertical projection, 31, to the upper end, 28, of which head, 26, is adjustably secured. The ring, 30, of the oscillator, 29, encompasses the boiler, 31, of the engine, and at its lowest portion, 32, below the boiler, is provided with a boxing, 33, in which is a horizontal wheel, 34, held in the boxing, 33, by vertical journals, 35 and 36. Depending from the bottom, 37, of the boiler, 31, are two brackets, 38 and 39, between which is placed the casing, 33, and wheel, 34, these brackets serving as a guideway between which the horizontal wheel, 34, travels.

Conveniently located upon a support, 40, is the balance wheel, 41. This balance wheel, 41, has the journal, 42, by which it is held to the bracket, 40, and alined with the balance wheel, 41, and upon its extended journal, 43, is a keyed toothed wheel, 44, which is meshed with teeth, 45, upon the ring, 30, of the oscillator, 29.

The oscillator, 29, is secured in any convenient way to the locomotive, as, for instance, it may have two arms, 46 and 47, which engage supports, 48 and 49, secured to the top of the locomotive boiler, 31.

With the construction described it will be readily perceived that in use, as the locomotive travels over the track, the headlight, 11, will be swung from side to side as the locomotive moves around the curve. This is as usual in devices of this construction. But heretofore in devices of this kind there has been more or less of an irregular or jerky movement of the headlight, so that it lacks the necessary steadiness in throwing the light ahead of the track. With the oscillator and balance wheel already shown and described, the headlight is steadied and moved from side to side with a regular swinging movement. It will be perceived that as the movement of the engine throws the headlight from side to side, the balance wheel, 41, through the toothed wheel, 44, and teeth, 45, steadies this movement. Also, by the adjustability of the yoke, 18, horizontally, and the head, 26, with the fork, 24, vertically, the leverage may be varied so that the headlight may be swung more or less rapidly according to the speed which it is purposed to give the locomotive in traveling. This adjustability adapts the same device to locomotives on both fast and slow trains.

Sheet 2 shows a modification of the device. To the front, 2, of the locomotive boiler, 31, on top, is secured a frame, 50, by its base, 51. This frame has two horizontal bars, 52, and 53, in which are journaled the pintles, 7 and 8, of vertical rods, 9 and 10, which carry the usual headlight, 11, having the flaring open end, 12. The lower rod, 10, extends downwardly and the end of its pintle, 8, bears in the base, 51, of the frame, 50. Between the base, 51, and the bar, 52, there is fastened to the vertical rod, 10, a sector, 54, having the teeth, 55, at the rear. The base, 51, extends backwardly and upwardly and then forwardly, forming a lip, 56. In this lip, 56, are holes, 57, and 58, in which bear the pintles, 59 and 60, of a vertical shaft, 61, carrying a balance wheel, 62. Secured to the shaft, 61, is a pinion, 63, which meshes with the teeth, 55, of the sector, 54. Extending backwardly from the headlight, 11, is a box, 64, having the slot, 65. Through this slot, 65, extends loosely the upper end, 66, of a rod, 67. The lower end, 68, of this rod, 67, is held adjustably in an arm, 69, which in turn is held adjustably by a set screw, 27, to the upper end, 28, of the oscillator, 29. This oscillator is constructed and arranged as in the first form of the device, and has the same arrangement of the horizontal wheel, boxing and brackets beneath the boiler.

The form shown in Sheet 2, and just described, operates in substantially the same way as the form shown in Fig. 1. The oscillator operating through the connecting mechanism throws the headlight from side to side as the locomotive turns the curves. The balance wheel, 62, steadies the headlight in the same manner as it is steadied by the balance wheel in the other form. The adjustable arrangement of the slotted bar, 64, the rod, 67, and the arm, 69, permits of an adjustment of the headlight similar to that obtained by the construction shown in the first form.

In both forms the horizontal wheel, 34, attached to the oscillator, 29, below the boiler, acts like a pendulum to swing the oscillator from side to side and through the intervening mechanism to aline the headlight with the track, whatever be the movement of the locomotive.

Having described my invention, what I claim is:

1. The combination of a swinging headlight, an oscillator consisting of a ring adapted to surround a locomotive boiler, said oscillator having an extension to which the headlight is attached.

2. The combination of a swinging headlight, an oscillator consisting of a ring adapted to surround a locomotive boiler, said oscillator having an extension to which the headlight is attached, the oscillator having a weight attached to its bottom.

3. A combination of a swinging headlight, an oscillator consisting of a ring adapted to surround a locomotive boiler, said oscillator having an extension to which the headlight is attached, the oscillator having a wheel attached to its bottom and guides within which the wheel bears.

4. The combination of a swinging headlight, and its supporting frame; the toothed sector secured to the headlight, and a balance wheel adjusted to the sector and having a pinion which engages the sector.

5. The combination of a swinging headlight; a yoke provided with a vertical bar and adjustably connected to the headlight; an oscillator and a fork adjustably held to the oscillator, the vertical bar of the yoke coming between the prongs of the fork.

6. The combination of a swinging headlight having a yoke provided with a vertical bar and adjustably connected to the headlight; an oscillator having a head adjustably secured thereto, a fork swiveled in the head, the vertical bar of the yoke coming between the prongs of the fork.

In testimony whereof I affix my signature in presence of two witnesses.

CHARLES OWEN MAPHIS.

Witnesses:
C. D. MAPHIS,
ED. S. CONRAD.

---

Copies of this patent may be obtained for five cents each, by addressing the "Commissioner of Patents, Washington, D. C."